ized Patent

United States Patent
Johnson et al.

(10) Patent No.: US 7,756,888 B2
(45) Date of Patent: Jul. 13, 2010

(54) METHOD AND APPARATUS FOR PROVIDING HETEROGENEOUS RESOURCES FOR CLIENT SYSTEMS

(75) Inventors: Darrin P. Johnson, Mountain View, CA (US); Kais Belgaied, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 364 days.

(21) Appl. No.: 11/773,170

(22) Filed: Jul. 3, 2007

(65) Prior Publication Data

US 2009/0012963 A1   Jan. 8, 2009

(51) Int. Cl.
 *G06F 17/30* (2006.01)
(52) U.S. Cl. .................. 707/770; 707/802; 707/812
(58) Field of Classification Search .................. 707/3, 707/10, 100, 104.1
See application file for complete search history.

(56) References Cited

U.S. PATENT DOCUMENTS

| | | | | |
|---|---|---|---|---|
| 2002/0043771 A1* | 4/2002 | Ito et al. | .................. | 277/591 |
| 2002/0143942 A1* | 10/2002 | Li et al. | .................. | 707/10 |
| 2003/0018621 A1* | 1/2003 | Steiner et al. | .................. | 707/3 |
| 2003/0065774 A1* | 4/2003 | Steiner et al. | .................. | 709/225 |
| 2003/0167270 A1* | 9/2003 | Werme et al. | .................. | 707/10 |
| 2004/0128538 A1* | 7/2004 | Gmuender et al. | .................. | 709/229 |
| 2005/0055350 A1* | 3/2005 | Werme et al. | .................. | 707/10 |
| 2005/0177600 A1* | 8/2005 | Eilam et al. | .................. | 707/104.1 |
| 2005/0197877 A1* | 9/2005 | Kalinoski | .................. | 705/8 |
| 2006/0212473 A1* | 9/2006 | Carusi et al. | .................. | 707/103 R |
| 2007/0073732 A1* | 3/2007 | Kahn et al. | .................. | 707/10 |
| 2007/0271276 A1* | 11/2007 | Allen et al. | .................. | 707/10 |
| 2007/0288512 A1* | 12/2007 | Matsubara et al. | .................. | 707/103 R |
| 2008/0021751 A1* | 1/2008 | Behrendt et al. | .................. | 705/8 |
| 2008/0189312 A1* | 8/2008 | Taranov et al. | .................. | 707/101 |
| 2008/0313333 A1* | 12/2008 | Bae et al. | .................. | 709/226 |

* cited by examiner

*Primary Examiner*—Charles Rones
*Assistant Examiner*—Rezwanul Mahmood
(74) *Attorney, Agent, or Firm*—Park, Vaughan & Fleming LLP; Mark Spiller

(57) ABSTRACT

One embodiment of the present invention provides a system that provides heterogeneous resources for client systems. During operation, the system maintains a stateful resource database that tracks heterogeneous resources in a given environment. The system receives requests from client systems, and in response to the requests searches for a heterogeneous resource in the stateful resource database that matches the request. If the system finds an available heterogeneous resource that matches the request, it proceeds to submit the request to the resource. Maintaining and using the stateful resource database facilitates efficiently sharing scarce heterogeneous resources across a number of client systems.

20 Claims, 3 Drawing Sheets

METHOD AND APPARATUS FOR PROVIDING HETEROGENEOUS RESOURCES FOR CLIENT SYSTEMS

BACKGROUND

1. Field of the Invention

The present invention relates to techniques for managing scarce resources in distributed computing environments. More specifically, the present invention relates to a method and an apparatus for tracking and managing heterogeneous resources for client systems in a distributed environment.

2. Related Art

Distributed computing environments are evolving towards a "commodity computing model," in which various tasks may no longer exclusively execute on specific nodes. In such a model, resource consolidation and increased resource utilization are desirable, cost-effective goals. However, resource consolidation options may be limited in situations that involve: legacy systems, specialized hardware, system capacity limitations, and environments in which resources are distributed. Examples of such difficult-to-consolidate resources can include: specialized hardware support for encryption; specialized telecommunications links (e.g., satellite links); specialized hardware and/or software for video/audio compression and decompression; and third party services, such as print services, back-up services, and secure remote storage.

In typical systems, specialized hardware is only useful to a single computer system. For example, a hardware cryptography accelerator is often accessible only to processes that run on the same computer system, and may be under-utilized because it cannot be made available to remote processes in a distributed environment. As a result, computer systems that need occasional access to a given resource are often over-provisioned to include that resource, thereby leading to higher system cost and low average resource utilization.

Hence, what is needed is a method that facilitates managing heterogeneous resources without the above-described limitations.

SUMMARY

One embodiment of the present invention provides a system that provides heterogeneous resources for client systems. During operation, the system maintains a stateful resource database that tracks heterogeneous resources in a given environment. The system receives requests from client systems, and in response to the requests searches for a heterogeneous resource in the stateful resource database that matches the request. If the system finds an available heterogeneous resource that matches the request, it proceeds to submit the request to that resource. Maintaining and using the stateful resource database facilitates efficiently sharing scarce heterogeneous resources across a number of client systems.

In some embodiments, the heterogeneous resources can include one or more of the following: a hardware resource; a software resource; a licensed software resource; and a network connection linking two or more devices.

In some embodiments, one or more heterogeneous resources and client systems can be either local to a given system and/or highly distributed. A given type of a heterogeneous resource may scale from one instance to multiple instances in the given environment, for instance depending on demand and/or cost.

In some embodiments, if submitting the request to an available heterogeneous resource fails, the system searches for a replacement resource for the request and then submits the request to the replacement resource.

In some embodiments, the system uses the stateful resource database to track one or more of the following:
 a name for the heterogeneous resource;
 a service type for a heterogeneous resource;
 location and/or ownership information for a heterogeneous resource;
 metering and/or cost information for a heterogeneous resource;
 status and/or availability information for a heterogeneous resource;
 capacity information for a heterogeneous resource; and
 policy information for a heterogeneous resource.

In some embodiments, the system encapsulates the request and any associated data while submitting the request to an available heterogeneous resource. The system then routes and transfers this encapsulated request to the available heterogeneous resource, and ensures that any results from the request are transferred to the requesting client system and/or other specified recipients.

In some embodiments, while searching for an available heterogeneous resource for a request, the system considers one or more of the following:
 a priority associated with the request;
 a maximum latency for the request;
 a cost for the request;
 the scarcity of one or more heterogeneous resources;
 the capacity of one or more heterogeneous resources;
 the availability of one or more heterogeneous resources; and
 a policy associated with one or more heterogeneous resources.

In some embodiments, the system uses the stateful resource database to improve resource utilization for a set of scarce heterogeneous resources.

In some embodiments, the system receives a manually-constructed stateful resource database and/or automatically populates a stateful resource database using a resource discovery mechanism.

In some embodiments, the system periodically checks the status, location, and/or availability of one or more heterogeneous resources.

In some embodiments, an application on the client system is designed to identify an application operation that can use a heterogeneous resource. The application is also configured to contact the stateful resource database to find one or more heterogeneous resources that can be used to perform the application operation.

In some embodiments, an application is configured to register a local heterogeneous resource with the stateful resource database.

In some embodiments, an application checks whether an identified application operation can be performed using local resources before contacting the stateful resource database.

Figure 1:
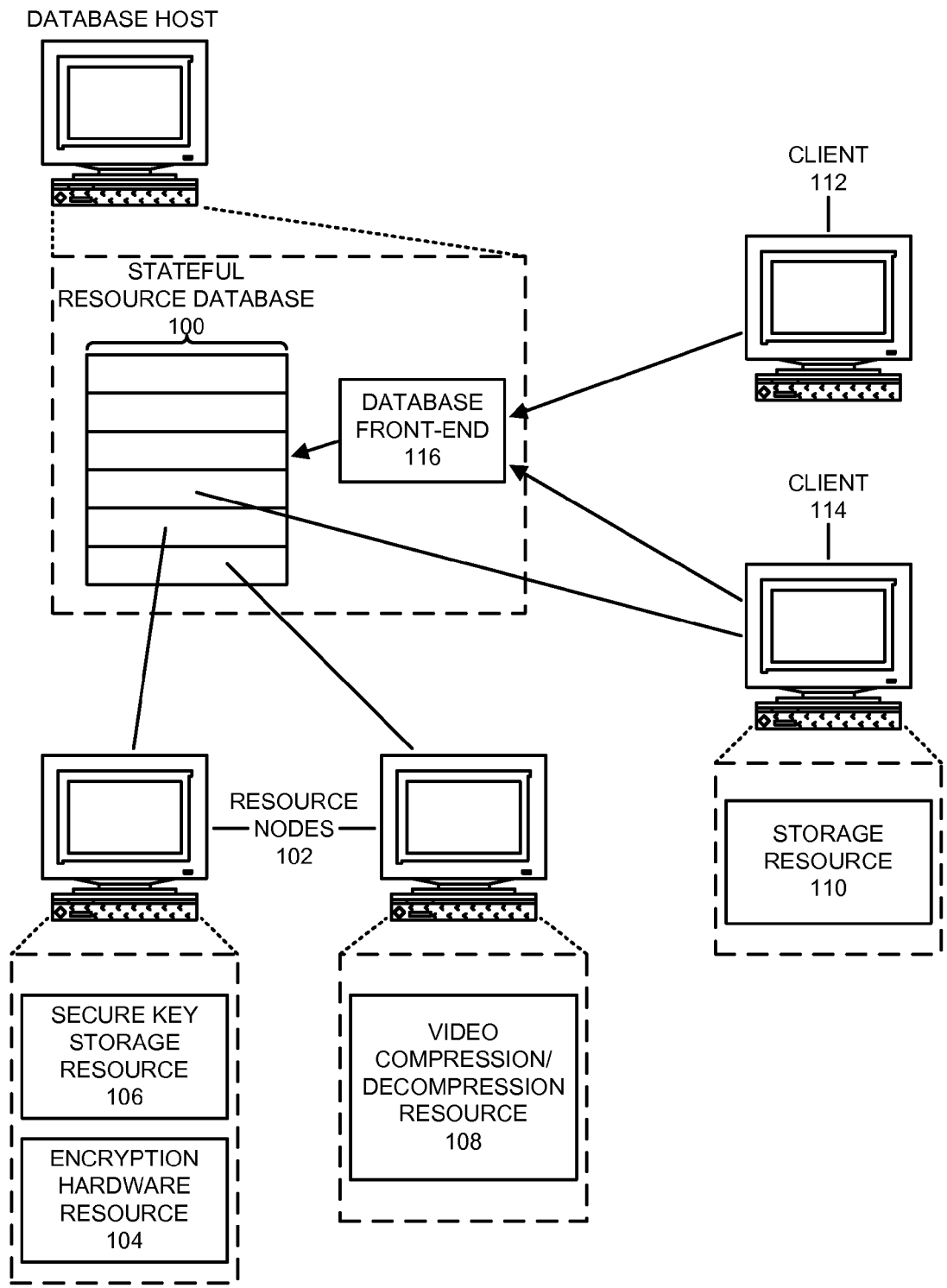
FIG. 1 illustrates a stateful resource database that stores a map of resources available in a given environment in accordance with an embodiment of the present invention.

Table 1 illustrates pseudocode for providing a resource in response to a client request in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Sharing Scarce Heterogeneous Resources

While most computing systems typically share some common structural aspects (e.g., a processing element, some amount of memory, and some form of persistent storage), some computing resources are more heterogeneous, and rarer. For instance, in a data center that includes an uplink to a satellite network connection, computer systems are typically not connected directly to the satellite link. Instead, one computer system with specialized hardware often handles requests related to this specialized resource, and forwards packets to the satellite link on the behalf of other systems in the environment. Other examples include: specialized resources for video- and audio-compression; or resources that facilitate secure financial transactions (e.g. encryption hardware and secure secret-key storage).

While sharing such scarce heterogeneous resources can reduce cost and improve resource utilization, there are currently no good mechanisms that enable such sharing. Hence, administrators typically need to either manually configure systems to share resources (if possible) or alternatively overprovision resources so that every computer system that may need access to a given resource is provisioned with an instance of that resource. Note that manual configurations typically focus on a single resource (e.g., printing services, or the satellite link), and do not facilitate managing multiple resources in an integrated manner. An integrated approach, on the other hand, could push awareness of resources to the rest of the enterprise, and can provide benefits such as prioritization, feedback, and re-use of software infrastructure.

One embodiment of the present invention provides a system that manages and tracks a set of heterogeneous resources available for use by client nodes within a given environment, along with the resources' capabilities and associated costs. This system transparently provides access to these heterogeneous resources, thereby facilitating management of resource trade-offs and improving resource utilization.

Tracking and Managing Scarce Heterogeneous Resources

In one embodiment of the present invention, the system includes: a stateful resource database, a search mechanism, and a task transport mechanism. The stateful resource database tracks the available resources in a given environment. These resources may or may not be explicitly defined, and the mapping can include: type information for resources systems; size/capacity information for resources; and identification information for systems with unique capabilities. The stateful resource database may be generated using a variety of methods, including: manual creation, automated discovery, or a hybrid approach. The database is stateful, and maintains a map of all the resources that are currently available for a particular task.

FIG. 1 illustrates a stateful resource database 100 that stores a map of resources available in a given environment. Referring to FIG. 1, this map includes the resources provided by two resource nodes 102. One of these resource nodes includes encryption hardware resource 104 and secure key storage resource 106, while the other includes video compression/decompression resources 108. Clients 112-114 can contact the database front-end 116 of the stateful resource database 100 to identify the set of resources which is available in the given environment, and can then arrange to use those resources. Note that some clients might only consume resources (e.g. client 112), while others may both consume as well as provide resources (e.g. client 110, which provides storage resource 110). Some computing systems, for instance, may provide a set of resources to the distributed environment with the condition that these resources will only be available when they are not being used by local jobs on that computing system. Note also that elements in the system can be local (e.g. gathered in a single data center) and/or highly-distributed, and that resources of any given type may scale from one to many instances.

In one embodiment of the present invention, the stateful resource database tracks and manages a heterogeneous resource. This heterogeneous resource may be scarce, for instance due to expense, uniqueness, and/or lower average usage. The set of heterogeneous resources can include: a specialized hardware resource; a software resource; a licensed software resource; and/or a network connection between two or more devices. For instance, the stateful resource database may track and manage: a satellite network link; specialized video compression/decompression hardware and/or software; specialized audio compression/decompression hardware and/or software; specialized encryption hardware and/or software; a storage resource; a secure storage resource; a licensed software product; a printing service; and a specialized information-processing service.

Figure 2:
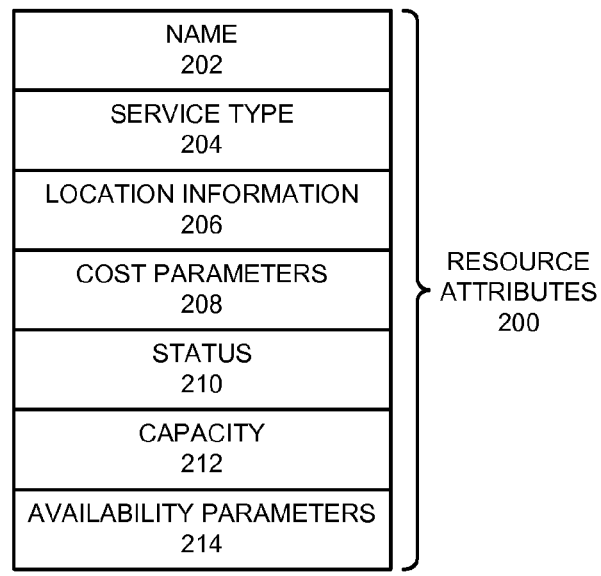
FIG. 2 illustrates an exemplary set of attributes tracked for a resource in the database in accordance with an embodiment of the present invention.

In one embodiment of the present invention, the system tracks a number of attributes for a given resource. For example, FIG. 2 illustrates an exemplary set of attributes 200 that the system tracks for a resource. In this example, the database may track resource attributes and/or parameters that include one or more of the following: a name 202; a service type 204; location information 206 that indicates the host, owner, and/or provider of the resource; one or more cost parameters 208; status information 210; a capacity 212 associated with the resource; and/or a set of availability parameters 214. Note that the system can manage a number of cost parameters 208, including power, material costs (e.g. paper and toner for a printing service), financial costs, and non-traditional costs such as latency. Depending on the type of service, the cost information may also include metering and/or billing info.

The system can use parameters such as a resource's status 210, capacity 212, and/or availability 214 to determine whether a resource may be suitable for a given client query. For instance, a given resource may be available, but not have any capacity. For a storage resource, this situation might arise when the resource is "alive" (can respond) and is free (e.g. is idle, and can receive requests), but does not have any remaining capacity available (e.g. does not have any available storage space). Availability parameters 208 may also be used to limit the timeframe in which a resource is available.

In some embodiments of the present invention, the system maintains a set of policies that can be used to relate resources, clients, and/or other system components. A rich set of relationships can be defined to maintain and prioritize efficient operation and resource usage in the system. For instance, the system can maintain a set of access policy parameters for: a user; an individual client; an individual resource; a group of clients; a group of resources; the top-level environment; one or more sub-environments; a set of capabilities in a given client or resource; and/or a set of capabilities in the system. Such policies may be determined and/or enforced by the stateful resource database, individual services, and/or groups or hierarchies of system components.

Figure 3:
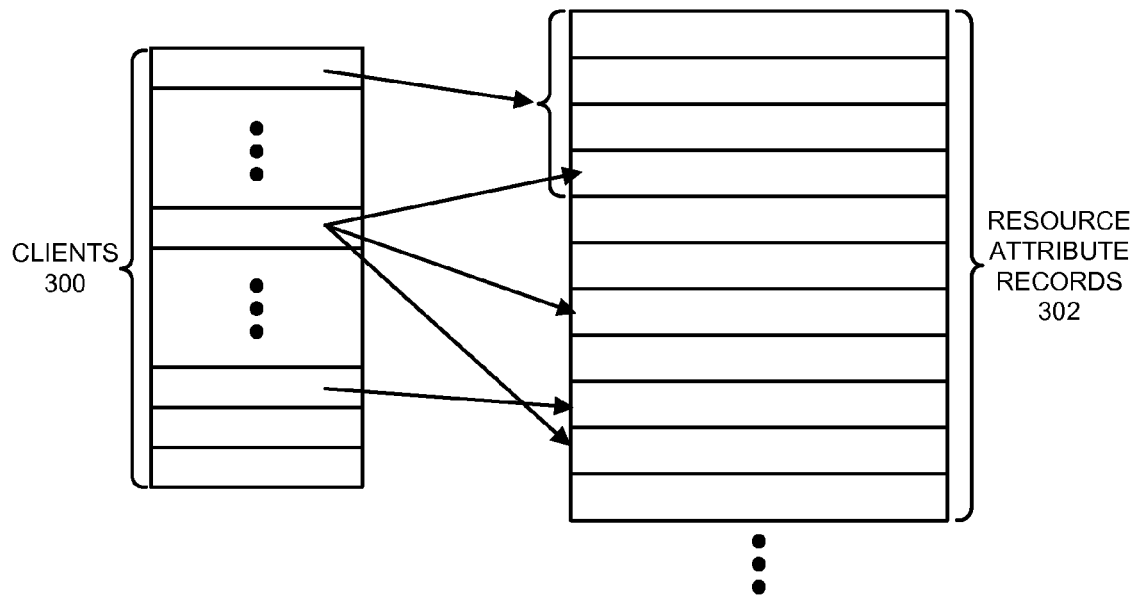
FIG. 3 illustrates an exemplary policy in which client accesses to resources are controlled using a set of permissions in accordance with an embodiment of the present invention.

FIG. 3 illustrates an exemplary policy in which client accesses to resources are controlled using a set of permissions in the form of an access control list (ACL). In FIG. 3, the ACL explicitly maps clients 300 to resource attribute records 302 to indicate the resources that each client 300 is allowed to access. Note that a database can facilitate a wide range of policy options, and the techniques described in the present invention are not limited to ACLs.

Figure 4:
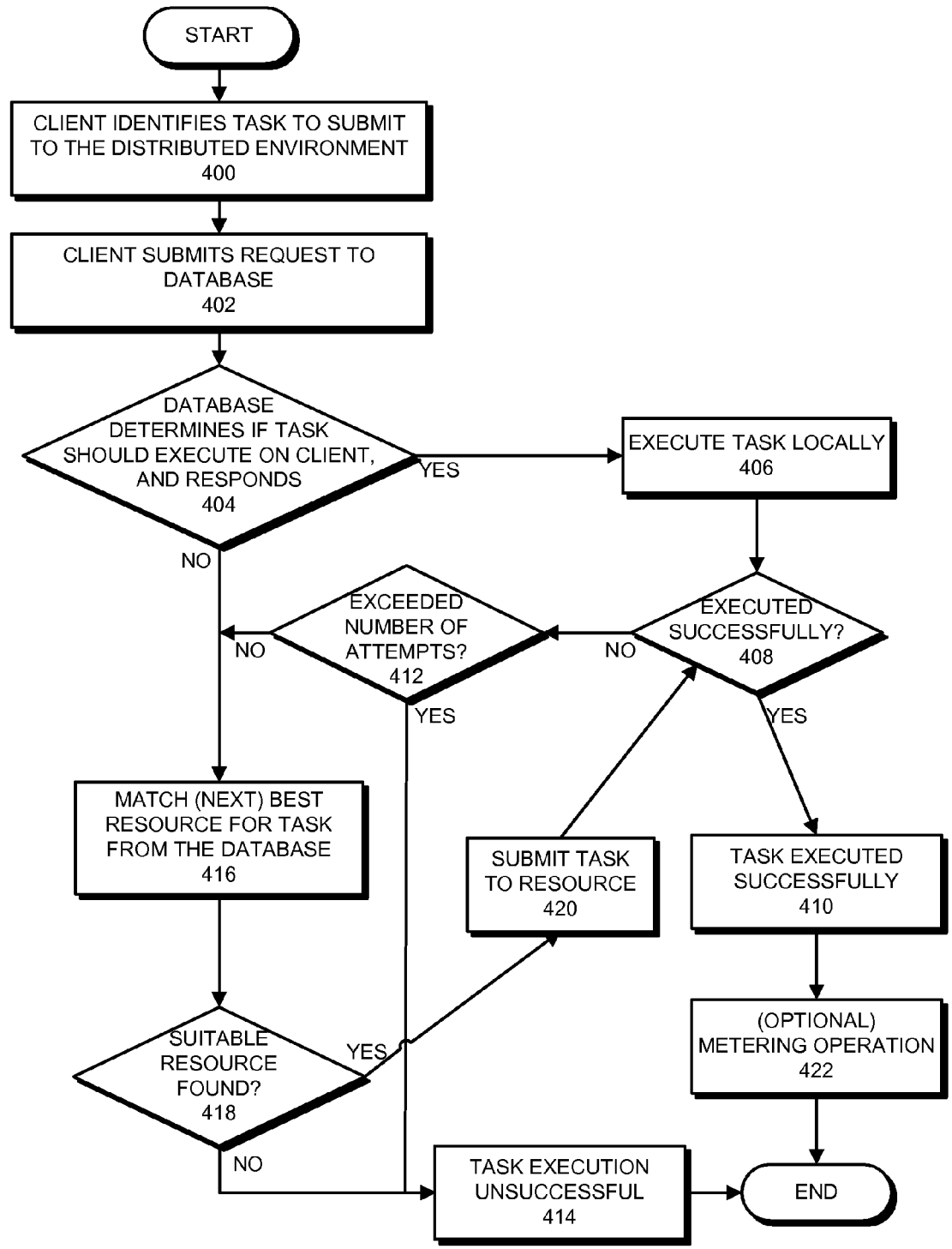
FIG. 4 presents a flow chart illustrating the process of providing a resource in response to a client request in accordance with an embodiment of the present invention.

FIG. 4 and Table 1 present a flow chart and pseudo-code, respectively, that illustrate the process of providing a resource in response to a client request. During operation, a client identifies a task to be submitted to the distributed environment (operation 400), and proceeds to submit a request to the stateful resource database (operation 402). The database determines from: (1) the available set of resources, (2) resource state, and (3) policies whether the task should be executed locally on the client (if possible, given client constraints) or elsewhere in the distributed environment (operation 404). If the database indicates that the task should execute locally (operation 406), and the task successfully executes locally (operation 408), the request ends in success (operation 410). Otherwise, if the task does not execute successfully, the system checks the number of attempts against a defined limit of possible attempts (operation 412). If this limit has been exceeded, the system determines that task execution was unsuccessful (operation 414) and the process completes.

If the database determines the task should not execute locally on the client system, or has attempted to execute locally on the client system and failed (and is still within the limit of possible attempts), the system uses the database to determine the next best resource candidate for the task (operation 416). If a suitable resource is identified (operation 418), the task is submitted to the identified resource (operation 420). If the task executes successfully (operations 408 and 410), the process completes. If execution fails, the system continues to retry until the limited number of attempts have been exceeded (operation 412), in which case the process completes (operation 414). Similarly, if no suitable resource is found in the database (operation 418), the process completes in failure (operation 414).

Note that the process may include an optional metering operation at the end of a task's successful execution (operation 422). Some clients may specify an a priori limit on the cost of resources to be used for a task, which the system takes into consideration during the resource-matching process. Other clients, however, might not specify such a limit, and instead choose to be billed on a per-usage basis. The metering operation can be used to determine and/or bill the client for the actual cost of resources used.

In one embodiment of the present invention, one or more search mechanisms are used to match and select resources in the stateful resource database with a given task. The search mechanism may use task-specific capability and/or service parameters, such as: a desired (or required) maximum or minimum latency; cost (including real and perceived costs); uniqueness; capacity; distributability; connection-orientation; and time of availability. Based on such criteria, a task is matched with one or more resources that could execute the task. As mentioned in FIG. 4 and Table 1, failover support can be provided if a given resource is not available, so that either: another resource is found to execute the task; the task is be executed with best effort on the client system; or the task fail all together if no matching resource is available in the distributed environment. Note that the sequence of searches (corresponding to the repeated calls to the function find_next_best ( ) in Table 1) is stateful within the scope of a task request (e.g. a task_request ( ) invocation), to prevent a resource from being returned more than once.

TABLE 1

```
task_request(task)
{
   if (current_system = best(resource_db, task type) {
      if (exec(current_system, task)) {
         return(success, task-results)
      } else {
         tried_once = TRUE;
         goto next_best;
      }
   } else {
   next_best:
      # stateful search database for best possible resource
      while (find_next_best(resource_db, task->task_type) {
         # send task to resource to execute
         if (exec(resource->best_system, task)) {
            return(success, task->results)
         }
      }
      # No better system found so default back to current
      # system to execute as best as possible
      if (!tried_once && exec(current_system, task)) {
         return(success, task->results)    # current system can
                                           # execute task
      } else {
         return(failure)    # current system can't execute task
      }
   }
}
find_next_best(resource_db, task)
{
   # Parse databased via preferred mechanism to find
   # "best" resource fit for particular task. Sequence of
   # calls to find_next_best( ) is stateful within a
   # task_request( ) invocation, and may limit # of retries.
}
main ( )
{
   while (tasks) {
      task_request{task}
   }
}
```

In some embodiments of the present invention, the system includes a virtualized transport mechanism that encapsulates, routes, and transfers data relating to a given request to a resource to be executed. This transfer mechanism can also return results to the requesting client or to another destination specified by the requesting client. Note that this transfer mechanism can be implemented in a number of ways, including a message passing interface that transfers task data and collects result data. Another exemplary transfer mechanism may involve adding wrappers and/or scripts around applications, tasks, and/or resources to provide functionality needed for features such as scheduling, status reporting, task submission, task re-submission, and returning results.

In one exemplary request, a task seeking to perform a set of encryption operations contacts the system, and, after searching the database, the system responds with an available specialized hardware encryption resource. Suppose the request data is transferred to this hardware encryption resource, but the hardware encryption resource fails. The system detects this failure, and searches for another comparable hardware resource. If none are available, the system may instead respond with a specialized software encryption resource that is optimized for the desired type of encryption operation. If that specialized software resource also fails, the final fallback may be for the client system to execute the encryption operations locally (albeit less efficiently than on the specialized hardware/software resources). Note that client system that has ceded control of scheduling for a local resource (to the database) may have to send a request to the database to make use of that local resource. The database may associate a client with a reduced cost (or a zero cost) for local services that the client provides to the distributed environment.

In some embodiments of the present invention, the system tracks the ongoing status of a resource to detect failures and/or unavailability of the resource. By tracking status, the system can automatically keep up-to-date status information that can assist the search mechanism in matching resources with tasks. The search mechanism can keep historical information, e.g., relating to client systems that need resources, are using resources, and/or are providing resources. For instance, the database can enable monitoring solutions that trigger extra resources on the fly to accommodate peak usage, or can decommission resources during periods of under-utilization.

In one embodiment of the present invention, the system includes one or more mechanisms to populate the stateful resource database. For instance, the system may use an automatic resource discovery mechanism in the database to locate resources, or a similar mechanism in the resource providers and/or clients to locate the database. Alternatively, the system may also be based on (or use as a starting point) a manually-constructed database.

In some embodiments of the present invention, application developers are aware that the database capability is available during development of an application. These developers can qualify, quantify, and/or identify needs in the application that might benefit from the use of external resources during operation, and can incorporate database requests into their application using a defined set of application programmer interfaces (APIs). In this way, developers can characterize aspects of the application based on expected client hardware (e.g. expected local costs and resources) and a set of expected operations. One approach is to continue executing simple operations (e.g. basic computations) locally on the client, while striving to farm out operations that involve (or require) more expensive or unique capabilities. For instance, an e-commerce application writer may choose to have an application check whether an encryption resource is available in the distributed environment as a cheap performance-enhancing alternative, and can configure the application to attempt to make a corresponding request when a stateful resource database is available. Note that application developers may choose to use such a database for a wide variety of reasons, e.g., to access capabilities that the local system does not have, or to try to improve the execution of operations that could execute locally but would operate more quickly or efficiently elsewhere. Note also that resource and cost decisions may be determined based on user input or derived from user preferences.

The system and application developer may also account for system overhead in servicing requests. Depending on the type and extent of the task, the benefits gained from using the available heterogeneous resources may or may not exceed overhead related to querying the database and transferring the request. For instance, the system may determine that the cost of transferring data to a compression resource and then transferring the compressed result back to the client system involves a higher cost than performing the operation locally on the client system. The system may similarly determine (based on a set of policies for a resource) that a client system's priority for a specific resource is sufficiently low that that specific resource should not be considered a valid option for that client.

In summary, one embodiment of the present invention uses a stateful resource database that manages and provides a set of heterogeneous resources for clients in a distributed environment. This database provides a transparent distributed environment to applications and users that can reduce the need to replicate heterogeneous resources and can increase the utilization of existing specialized resources. This environment can also decrease management costs by providing seamless failure handling and can adapt to fluctuating resource usage.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing heterogeneous resources for client systems, comprising:

maintaining a stateful resource database that tracks a set of heterogeneous hardware and software resources available for a given environment, wherein the set of heterogeneous hardware and software resources comprises scarce, specialized, machine-specific hardware and software resources that are configured to automatically accept and execute operations requested by client systems in the given environment, and wherein the stateful resource database facilitates managing the efficient operation and sharing of these scarce hardware and software resources;

receiving a request from a client system;

searching for a heterogeneous resource in the stateful resource database in response to the request;

matching an available heterogeneous resource in the stateful resource database with the request; and submitting the request to the available heterogeneous resource, which then executes the request;

whereby maintaining and using the stateful resource database facilitates efficiently sharing scarce heterogeneous resources across a set of client systems.

2. The method of claim 1, where the set of heterogeneous hardware and software resources includes one or more of the following:

a licensed software resource; and a network connection linking two or more devices.

3. The method of claim 2,
   wherein one or more heterogeneous resources and client systems are local to a given system;
   wherein one or more heterogeneous resources and client systems are highly distributed; and
   wherein a given type of heterogeneous resource scales from one instance to multiple instances.

4. The method of claim 1, wherein if submitting the request to the available heterogeneous resource fails, the method further comprises:
   searching for a replacement resource for the request; and
   submitting the request to the replacement resource.

5. The method of claim 1, wherein tracking a given heterogeneous resource involves tracking one or more of the following in the stateful resource database:
   a name for the heterogeneous resource;
   a service type for the heterogeneous resource;
   location and/or ownership information for the heterogeneous resource;
   metering and/or cost information for the heterogeneous resource;
   status and/or availability information for the heterogeneous resource;
   capacity information for the heterogeneous resource; and
   policy information for the heterogeneous resource.

6. The method of claim 1, wherein submitting the request involves:
   encapsulating the request and any associated data;
   routing the encapsulated request to the available heterogeneous resource;
   transferring the encapsulated request to the available heterogeneous resource; and
   transferring results, if any, to the client system and/or another specified recipient.

7. The method of claim 1, wherein searching for the available heterogeneous resource involves considering one or more of the following:
   a priority associated with the request;
   a maximum latency for the request;
   a cost for the request;
   the scarcity of one or more heterogeneous resources;
   the capacity of one or more heterogeneous resources;
   the availability of one or more heterogeneous resources; and
   a policy associated with one or more heterogeneous resources.

8. The method of claim 1, wherein the stateful resource database is used to improve resource utilization for a set of scarce heterogeneous resources.

9. The method of claim 1, wherein the method further comprises one or more of the following:
   receiving a manually-constructed stateful resource database; and
   automatically populating the stateful resource database using a resource discovery mechanism.

10. The method of claim 1, wherein maintaining the stateful resource database involves periodically checking the status, location, and/or availability of one or more heterogeneous resources.

11. The method of claim 1,
    wherein an application on the client system is designed to identify an application operation that matches the heterogeneous resource; and
    wherein the application is configured to contact the stateful resource database to find one or more heterogeneous resources that are capable of performing the application operation.

12. The method of claim 11, wherein the application is configured to register a local heterogeneous resource with the stateful resource database.

13. The method of claim 11, wherein the application checks whether local resources are able to perform the identified application operation before contacting the stateful resource database.

14. A computer-readable storage medium storing instructions that when executed by a computer cause the computer to perform a method for providing heterogeneous resources for client systems, the method comprising:
    maintaining a stateful resource database that tracks a set of heterogeneous hardware and software resources available for a given environment, wherein the set of heterogeneous hardware and software resources comprises scarce, specialized, machine-specific hardware and software resources that are configured to automatically accept and execute operations requested by client systems in the given environment, and wherein the stateful resource database facilitates managing the efficient operation and sharing of these scarce hardware and software resources;
    receiving a request from a client system;
    searching for a heterogeneous resource in the stateful resource database in response to the request;
    matching an available heterogeneous resource in the stateful resource database with the request; and
    submitting the request to the available heterogeneous resource, which then executes the request;
    whereby maintaining and using the stateful resource database facilitates efficiently sharing scarce heterogeneous resources across a set of client systems.

15. The computer-readable storage medium of claim 14, where the set of heterogeneous hardware and software resources includes one or more of the following:
    a licensed software resource; and
    a network connection linking two or more devices.

16. The computer-readable storage medium of claim 15,
    wherein one or more heterogeneous resources and client systems are local to a given system;
    wherein one or more heterogeneous resources and client systems are highly distributed; and
    wherein a given type of heterogeneous resource scales from one instance to multiple instances.

17. The computer-readable storage medium of claim 14, wherein if submitting the request to the available heterogeneous resource fails, the method further comprises:
    searching for a replacement resource for the request; and
    submitting the request to the replacement resource.

18. The computer-readable storage medium of claim 14, wherein tracking a given heterogeneous resource involves tracking one or more of the following in the stateful resource database:
    a name for the heterogeneous resource;
    a service type for the heterogeneous resource;
    location and/or ownership information for the heterogeneous resource;
    metering and/or cost information for the heterogeneous resource;
    status and/or availability information for the heterogeneous resource;
    capacity information for the heterogeneous resource; and
    policy information for the heterogeneous resource.

19. The computer-readable storage medium of claim 14, wherein submitting the request involves:
   encapsulating the request and any associated data;
   routing the encapsulated request to the available heterogeneous resource;
   transferring the encapsulated request to the available heterogeneous resource; and
   transferring results, if any, to the client system and/or another specified recipient.

20. A computing device that includes a processor that provides heterogeneous resources for client systems, comprising:
   a maintenance mechanism configured to maintain a stateful resource database that tracks a set of heterogeneous hardware and software resources available for a given environment, wherein the set of heterogeneous hardware and software resources comprises scarce, specialized, machine-specific hardware and software resources that are configured to automatically accept and execute operations requested by client systems in the given environment, and wherein the stateful resource database facilitates managing the efficient operation and sharing of these scarce hardware and software resources;
   a receiving mechanism configured to receive a request from a client system;
   a search mechanism configured to search for a heterogeneous resource in the stateful resource database in response to the request;
   a matching mechanism configured to match an available heterogeneous resource in the stateful resource database with the request; and
   a submission mechanism configured to submit the request to the available heterogeneous resource, which then executes the request;
   whereby maintaining and using the stateful resource database facilitates efficiently sharing scarce heterogeneous resources across a set of client systems.

* * * * *